US010657559B2

(12) United States Patent
Sinha et al.

(10) Patent No.: US 10,657,559 B2
(45) Date of Patent: May 19, 2020

(54) GENERATING AND UTILIZING A CONVERSATIONAL INDEX FOR MARKETING CAMPAIGNS

(71) Applicant: Adobe Inc., San Jose, CA (US)

(72) Inventors: Moumita Sinha, Bangalore (IN); Meghanath Macha Yadagiri, Bangalore (IN); Kokil Jaidka, Bangalore (IN); Niyati Chhaya, Pune (IN)

(73) Assignee: ADOBE INC., San Jose, CA (US)

( * ) Notice: Subject to any disclaimer, the term of this patent is extended or adjusted under 35 U.S.C. 154(b) by 386 days.

(21) Appl. No.: 15/164,698

(22) Filed: May 25, 2016

(65) Prior Publication Data

US 2017/0345054 A1 Nov. 30, 2017

(51) Int. Cl.
*G06Q 30/02* (2012.01)
(52) U.S. Cl.
CPC ..... *G06Q 30/0255* (2013.01); *G06Q 30/0201* (2013.01); *G06Q 30/0269* (2013.01)
(58) Field of Classification Search
CPC ...................................................... G06Q 30/02
USPC ......................................................... 705/7.32
See application file for complete search history.

(56) References Cited

U.S. PATENT DOCUMENTS

| | | | | |
|---|---|---|---|---|
| 2010/0169343 A1* | 7/2010 | Kenedy | .................. | G06F 16/285 707/758 |
| 2014/0200999 A1* | 7/2014 | Canny | ................ | G06Q 30/0251 705/14.54 |
| 2014/0236683 A1* | 8/2014 | Howe | ................ | G06Q 30/0257 705/12 |
| 2014/0236708 A1* | 8/2014 | Wolff | ................. | G06Q 30/0207 705/14.41 |
| 2014/0278973 A1* | 9/2014 | Lowe | .................. | G06Q 30/0255 705/14.53 |
| 2015/0332336 A1* | 11/2015 | Hong | ..................... | G06Q 30/02 705/14.66 |
| 2016/0140577 A1* | 5/2016 | Morley | .............. | G06Q 30/0201 705/7.31 |
| 2016/0210657 A1* | 7/2016 | Chittilappilly | ..... | G06Q 30/0246 |

(Continued)

OTHER PUBLICATIONS

Kerr, B. (Oct. 2003). Thread arcs: An email thread visualization. In Information Visualization, 2003. INFOVIS 2003. IEEE Symposium on (pp. 211-218). IEEE.

(Continued)

*Primary Examiner* — Nga B Nguyen
(74) *Attorney, Agent, or Firm* — Keller Jolley Preece

(57) ABSTRACT

Methods and systems for providing targeted marketing include using consumer-centric indices to identify users who are most conversant with marketing communications. In particular, one or more embodiments generate a model that indicates a probability of user interactions based on dynamic data. The dynamic data indicates a time to action for each user interaction with a marketing communication within an observation window. The model fits the dynamic data to a distribution and determines the parameters of the distribution. Using the parameters of the distribution, one or more embodiments calculate interest scores for users who have received marketing communications. One or more embodiments select a set of users as a target audience based on the interest scores and provide marketing communications to target audience.

20 Claims, 9 Drawing Sheets

(56) References Cited

U.S. PATENT DOCUMENTS

| | | | |
|---|---|---|---|
| 2016/0232575 A1* | 8/2016 | Kirti | G06Q 30/0269 |
| 2017/0103414 A1* | 4/2017 | Liu | G06Q 30/0249 |
| 2017/0236148 A1* | 8/2017 | James | G06Q 30/0246 |
| | | | 705/14.45 |

OTHER PUBLICATIONS

Karagiannis, T., & Vojnovic, M. (Apr. 2009). Behavioral profiles for advanced email features. In Proceedings of the 18th international conference on World wide web (pp. 711-720). ACM.

Navaroli, N., & Smyth, P. (Apr. 2015). Modeling Response Time in Digital Human Communication. In Ninth International AAAI Conference on Web and Social Media.

Viégas, F. B., Golder, S., & Donath, J. (Apr. 2006). Visualizing email content: portraying relationships from conversational histories. In Proceedings of the SIGCHI conference on Human Factors in computing systems (pp. 979-988). ACM.

Bawm, Z. L., & Nath, R. P. D. (Dec. 2014). A Conceptual Model for effective email marketing. In Computer and Information Technology (ICCIT), 2014 17th International Conference on (pp. 250-256). IEEE.

May, P., Ehrlich, H.C., Steinke, T. (2002). Email marketing: success factors. Retrieved from http://eprints.kingston.ac.uk/2108/1/paper.html.

Luo, X., Nadanasabapathy, R., Zincir-Heywood, A. N., Gallant, K., & Peduruge, J. (2015). Predictive Analysis on Tracking Emails for Targeted Marketing. In Discovery Science (pp. 116-130). Springer International Publishing.

M. Taylor, 'Email Marketing Software & Services—Which One's Best?', Venture Harbour, 2014. [Online]. Available: http://www.ventureharbour.com/email-marketing-software-tools-onebest/. [Accessed: Nov. 25, 2014].

Email marketing Landscape: http://www.pardot.com/blog/the-2015-email-marketing-landscape/, retrieved on Mar. 22, 2016.

Stats about email marketing: http://blog.hubspot.com/marketing/email-marketing-stats-list, retrieved Mar. 22, 2016.

Average Email Campaign Stats of MailChimp Customers by Industry http://mailchimp.com/resources/research/email-marketing-benchmarks/ Mar. 1, 2016.

Degrees of email personalization: http://www.exacttarget.com/blog/6-degrees-of-email-personalization/ May 29, 2014.

Dynamic Tags for email personalization: http://blog.hubspot.com/blog/tabid/6307/bid/33315/33-Examples-of-Dynamic-Tags-to-Personalize-Your-Email-Sends.aspx, retrieved Mar. 22, 2016.

* cited by examiner

GENERATING AND UTILIZING A CONVERSATIONAL INDEX FOR MARKETING CAMPAIGNS

BACKGROUND AND RELEVANT ART

Marketing campaigns allow businesses and other entities to promote products and services and increase a consumer base. For example, marketers have experienced significant success with email marketing. In particular, email marketing results in a relatively high return on investment when compared to other forms of marketing. Given the popularity of email marketing, it is natural for marketers to increase the amounts of marketing emails sent to users. Unfortunately, this increase in email marketing can reduce rather than improve the effectiveness of a marketing campaign.

When consumers are exposed to multiple email campaigns by a marketer, each consumer interacts or reacts differently with these campaigns. In particular, not all consumers who receive a marketing communication will take action with respect to the marketing communication or purchase the marketed product (e.g., good or service). Furthermore, consumers become fatigued after a threshold number of marketing communications, thereby reducing the effectiveness of any subsequent marketing communications. As such, in order to avoid consumer fatigue and the corresponding reduction of campaign effectiveness, marketers must take great care to target primarily those consumers that are mostly likely to purchase the marketed product or otherwise interact with the marketing campaign, so as to reduce the overall amount of marketing communications targeted consumers receive.

To address the foregoing problems, some conventional marketing systems allow audience segmentations based on various audience attributes, such as audience demographics. In addition, some conventional marketing systems use consumer-performance metrics to determine how consumers are interacting with campaigns. Specifically, the conventional marketing systems calculate performance metrics such as click-through rates, conversion rates, and click-to-open ratios to determine how consumers are interacting with the marketing campaigns. While these conventional systems provide some marketing insights for groups of consumers, they are typically unable to accurately determine which consumers will interact with a marketing campaign or to limit the delivery of marketing communications to less interested consumers. The resulting marketing fatigue reduces the effectiveness of subsequent marketing campaigns with consumers that would have otherwise been interested in the marketing campaigns.

These and other disadvantages may exist with respect to conventional marketing techniques.

SUMMARY

Introduced here are methods and systems for providing consumer-centric indexing for more effective audience targeting in marketing campaigns. In accordance with one or more disclosed embodiments, a marketing system allows a marketer to accumulate and analyze data for a plurality of users. In particular, the marketing system gathers data from past marketing campaigns and then analyzes the data. The analyzed data can include consumer actions, such as clicks, opens, purchases, etc. in response to previous email campaigns. The data can further indicate the time taken by a user before performing an action (e.g., time to click, time to open). The marketing system then fits a parametric distribution to the accumulated data. The marketing system uses a time to action to determine a cumulative probability to perform an action from the fitted distribution, and then determines a conversational index for each consumer based on the cumulative probability. A marketer can then utilize the determined conversational indices to derive insights and perform segmentation of consumers in a more strategic way. As a result, a marketer is able to improve the effectiveness of future marketing campaigns by providing differential targeting to users based on the likelihood that the users will positively react to the marketing campaign.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1:
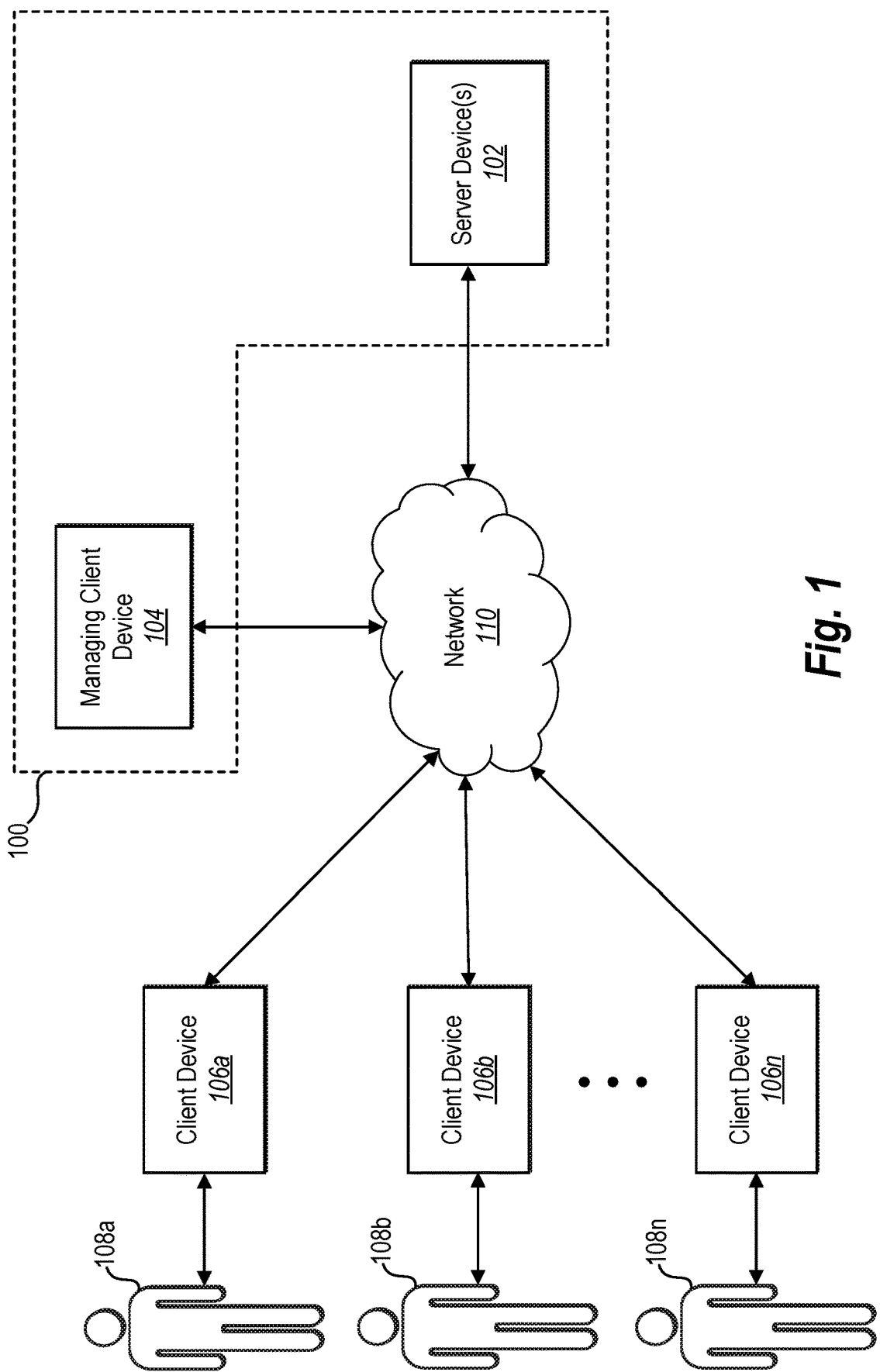
FIG. 1 illustrates a schematic diagram of an environment in which a marketing system operates in accordance with one or more embodiments.

One or more embodiments of the present disclosure provide a marketing system that generates and utilizes consumer-centric conversational indices to more efficiently and effectively provide marketing communications to users. Specifically, the marketing system trains a model to generate conversational indices for a plurality of users. The conversational indices indicate conversational relationships of the users with a particular brand. For example, the conversational indices indicate the current interests of the users with regard to one or more marketing campaigns. The marketing system uses the indices to provide marketing insights for determining which users are most likely to interact with marketing communications (e.g., marketing emails). This allows marketers to better target consumers and avoid unnecessary marketing fatigue often associated with marketing campaigns.

In one or more embodiments, the marketing system generates a training dataset for training the model. In particular, the training dataset includes data that indicates how long the users take to perform certain actions related to interacting with marketing communications. For example, the data can include a time to open, time to click, or time to conversion after a user receives a marketing communication. By capturing this dynamic data associated with the interactions of users with marketing communications, the marketing system can determine the diversity of users' interests better than with other metrics.

After collecting the data associated with users' interactions with marketing communications, the marketing system generates conversational indices (also referred to herein as "interest scores" or "conversational scores") for the users based on the collected data. A conversational index is a calculated number or score that represents a user's interest in a particular brand at any point in time in connection with a plurality of marketing communications for the brand. For example, the conversational index highlights a conversational intensity over a number of previous communications sent to the user based on how the user interacted or is likely to interact with the previous communications. Thus, the conversational index can provide insight into how a user's interest in the brand fluctuates based on the level of interaction. In some embodiments, a conversational index is based on data indicating the times to action for interactions by a user with regard to past marketing communications. In particular, the conversational index can be primarily based upon and or exclusively dependent on data indicating a time to open, a time to click, and/or a time to conversion after a user receives a marketing communication.

In one or more embodiments, the marketing system generates the conversational index by fitting the collected data to a parametric distribution. The marketing system characterizes the parametric distribution by estimating the parameters of the distribution. By estimating the parameters of the distribution, the marketing system can extend a curve of the distribution beyond an observation period for collecting the data. The extended curve allows the marketing system to estimate or predict data for users who did not interact with a specific marketing communication within an observation period. Thus, the marketing system can make use of the collected data to determine interest scores for all users who have received communications, even if a user has not interacted with all of the received communications.

Additionally, the marketing system uses the conversational indices for the users to aid in improving marketing strategy. Specifically, the marketing system provides marketing insight to marketers or other users who make decisions associated with marketing campaigns. For example, the marketing system provides the conversational indices to a marketer, which allows the marketer to segment the plurality of users who have received marketing communications into different audience segments. To illustrate, the marketer can segment the plurality of users who have received marketing communications into different segments based on the interest scores associated with the plurality of users and target the segments differently.

According to one or more embodiments, the marketing system selects a set of users from the plurality of users as a target audience. In particular, the marketing system selects a segment of users based on conversational indices/scores for the plurality of users. To illustrate, the segment of users can include a predetermined percentage of users with the highest conversational scores. In at least some examples, the marketing system selects the segment based on input from a marketer. After selecting at least one target audience, the marketing system provides a marketing communication (e.g., a marketing email) to the users in the target audience. By selecting the segment with the highest conversational scores as a target audience, the marketing system can target the users who are most likely to interact with the marketing communications and convert to consumers of the marketed product or service.

As described herein, the marketing system provides advantages over conventional marketing systems. Specifically, the marketing system collects and analyzes dynamic data associated with past marketing campaigns to generate a model from which the marketing system identifies trends and changes in user interest from one marketing campaign to another. The marketing system also provides analytical analysis of the dynamic data to a marketer in a way that aids the marketer in deriving insights and targeting segments of consumers in a more strategic way. As a result, a marketer is able to improve the effectiveness of future marketing campaigns and avoid the marketing fatigue that typically results from conventional marketing campaigns.

The disclosed features also improve the accuracy, speed, and efficiency of an analytics and marketing system. For example, the disclosed marketing system more accurately and efficiently predicts user interactions with fewer data points than conventional systems. In particular, the collection and analysis of user interactions with electronic communications using conversational indices based on dynamic data points reduces the number of data points that a server uses to produce similar or increased accuracy than with non-dynamic data points. Thus, the marketing system increases the efficiency of servers devices by collecting, processing, analyzing, and storing fewer data points, which becomes especially important when dealing with large numbers of marketing campaigns for many different potential consumers.

Additionally, by leveraging past marketing data to improve the segmentation and targeting of consumers, the marketing system reduces the amount of data transferred to potential consumers by limiting the amount of communications sent to people who are likely to be less interested or annoyed at receiving too many communications. Limiting communications reduces processing time, bandwidth usage, and database usage associated with sending electronic communications to many different users. Specifically, sending out fewer communications can result in many fewer communications processed and sent from servers to potential consumers, reducing loads on servers and reducing the amount of bandwidth or data required to send out the electronic communications.

FIG. 1 illustrates a schematic diagram of an environment that includes a marketing system 100. The description associated with FIG. 1 provides an overview of the environment. A more detailed description of the components and processes of the marketing system 100 are provided in relation to the remaining figures.

As illustrated by FIG. 1, the marketing system 100 provides marketing analysis and marketing communications for marketing campaigns. As used herein, the term "marketing campaign" refers to a step or series of steps that a marketer uses to promote a specific product. For example, a marketing campaign can include the generation and provision of a marketing communication (e.g., an email or other digital message that promotes a product or service via any digital communication medium). In at least some instances, a marketing campaign can include a plurality of marketing communications that correspond to a single promotion, including different variations of the same message (e.g., variations of emails with related, but different, content).

Alternatively, a marketing campaign can include a single marketing communication that corresponds to a single promotion.

In one or more embodiments, the marketing system 100 collects marketing performance data in connection with a plurality of marketing communications. FIG. 1 illustrates that the marketing system 100 includes server device(s) 102, a managing client device 104, and a plurality of client devices 106a-106n. The marketing system 100 allows the server device(s) 102 to obtain data associated with interactions by users 108a-108n with marketing communications by communicating with a plurality of client devices 106a-106n corresponding to the users 108a-108n via a network 110. As may be appreciated, the marketing system 100 allows the server device(s) 102 to obtain and analyze marketing communications related to any number of marketing campaigns, as may serve a particular embodiment.

Additionally, the marketing system 100 allows the server device(s) 102 to send marketing information to the managing client device 104 via the network 110 for use in generating or updating marketing campaigns. Although FIG. 1 illustrates that the server device(s) 102 and the managing client device 104 are separate components, the server device(s) 102 may include the managing client device 104. Alternatively, the managing client device 104 can include some or all of the functionality of the server device(s) 102 for analyzing marketing data and providing marketing communications to the user client devices 106a-106n.

According to one or more embodiments, the server device(s) 102 include one or more computing devices that collect, use, and store data associated with marketing campaigns. For example, the server device(s) 102 can include a plurality of computing devices connected via a local network 110. The server device(s) 102 can be marketing servers that are used primarily or exclusively to collect, use, and store marketing data in the marketing system 100. Alternatively, the server device(s) 102 can be part of a larger system capable of performing marketing tasks, as well as other tasks related to the provision of goods and services related to the marketing tasks.

In one or more embodiments, the managing client device 104 is a computing device associated with a marketer (e.g., a marketing strategist or marketing manager). The marketer can use the managing client device 104 to access marketing information associated with a plurality of users 108a-108n. The marketer can use the marketing information to identify subsets of individuals who are more conversant with a brand and are more likely to convert to consumers of the brand. Additionally, the marketer can use the marketing information to create campaigns to target different segments of users 108a-108n differently based on the likelihood that the segments will interact with the campaigns. For example, the marketer can associate different segments of users with different marketing strategies based on the marketing information. Although FIG. 1 shows only a single managing client device 104, the marketing system 100 can include any number of managing client device 104s for any number of marketers, as may serve a particular embodiment.

In one or more embodiments, the client devices 106a-106n are computing devices that allow users 108a-108n to receive, view, and interact with marketing communications. For example, the client devices 106a-106n can include mobile computing devices (e.g., smartphones, laptops), desktop computing devices, or other computing devices that include software capable of receiving marketing communications, as described in more detail in FIG. 8. To illustrate, the client devices 106a-106n can run email software that allows the client devices 106a-106n to send and receive email messages. As may be appreciated, a user may own a plurality of client devices 106a-106n that can access an email account that sends and receives email messages, including marketing email messages. Thus, the server device(s) 102 can communicate with an email server associated with the user's email account to provide a marketing email message to a plurality of client devices 106a-106n associated with a single user.

As described, the network 110 can include one or more private and/or public networks that use various communication technologies and protocols. Specifically, the server device(s) 102 may communicate with the managing client device 104 via a first connection with a first connection type (e.g., LAN). The server device(s) 102 may communicate with the client devices 106a-106n via a second connection with a second connection type (e.g., Internet). In at least some embodiments, the client devices 106a-106n do not communicate directly with the managing client device 104 via the network 110, though other embodiments and/or configurations of the marketing system 100 may allow the client devices 106a-106n and the managing client device 104 to communicate via the network 110.

Figure 2:
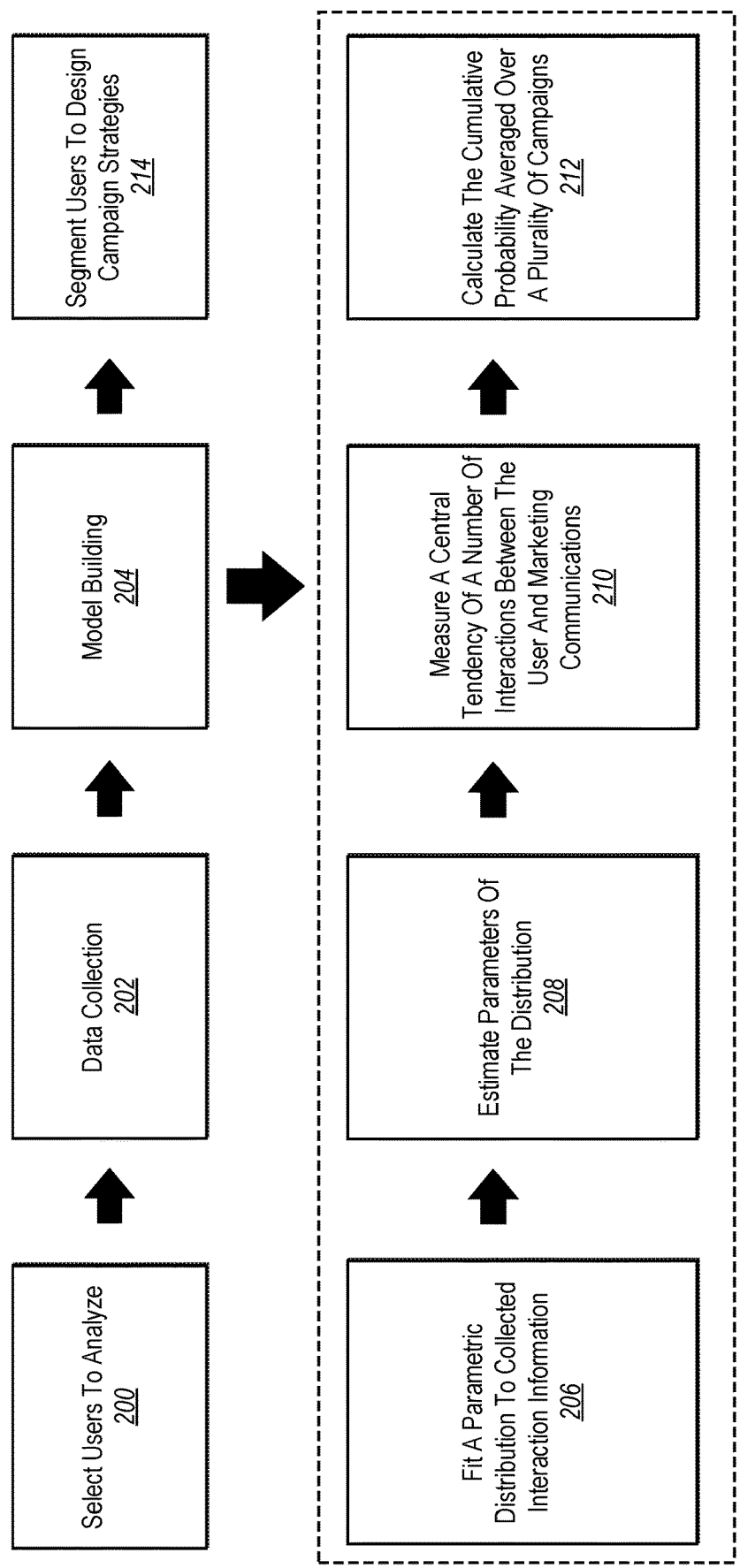
FIG. 2 illustrates a flow diagram of a marketing process using consumer-centric indexing in accordance with one or more embodiments.

As discussed, the systems and components discussed above with reference to FIG. 1 allow a marketing system 100 to collect and use user interaction information associated with marketing communications to improve targeted marketing campaigns. Specifically, the marketing system 100 uses the interaction data to provide consumer/user-centric marketing insights to a marketer for creating marketing campaigns and selecting appropriate target audiences. FIG. 2 illustrates an example flow diagram of a marketing process that includes consumer-centric indexing for improving marketing campaigns and tailoring communications to users.

As mentioned, the marketing system coordinates the collection and analysis of marketing data associated with a plurality of marketing communications. Specifically, the marketing system causes the server device(s) to send a marketing communication (e.g., an email message) for a marketing campaign to a plurality of users. The marketing system analyzes user interactions with the marketing communication, calculates interest scores for the users, and provides marketing insights to marketers for improving future marketing campaigns. The marketers then use the marketing insights to generate new marketing campaigns to a target audience.

In one or more embodiments, a marketing system selects 200 a plurality of users to analyze. In particular, the marketing system selects a plurality of users who have received at least one marketing communication associated with a marketing campaign. For example, the marketing system selects users based on input from at least one marketer. To illustrate, a marketer can select a plurality of users (or a subset thereof) that have received a plurality of marketing communications for a particular brand. Selecting users who have received marketing communications for a particular brand allows the marketing system to determine how the brand is performing and how to improve targeted advertising for that brand.

In one or more additional embodiments, a marketer selects a plurality of users that have received marketing communications for a plurality of different brands. For example, the marketer can select a plurality of users who have received marketing communications for a plurality of specific brands or all brands associated with marketing campaigns. By selecting users who have received marketing communications for different brands, the marketing system can identify users who are most likely to engage in interacting with marketing communications regardless of brand.

After the marketing system identifies which users to analyze, the marketing system collects 202 data associated with the marketing communication for each of the selected users. Specifically, the marketing system identifies marketing communications that have been provided to the selected users. For example, the marketing system can capture data that indicates a number of marketing communications that the marketing system provided to the selected users in connection with identified marketing campaigns. As mentioned, the identified marketing campaigns can correspond to one or more specific brands based on the desired marketing insights.

Additionally, the marketing system collects consumer-level information that indicates user interactions with the marketing communications for the selected users. In particular, the marketing system collects interaction information that indicates whether users have performed at least one enumerated action related to the marketing communication. To illustrate, the users can perform an action to click on a marketing communication, open a marketing communication, click on content in a marketing communication (e.g., an image or a hyperlink), purchase a product or service related to the marketing communication, select an unsubscribe option in the marketing communication, or perform other actions related to the marketing communication. The marketing system collects the information associated with the interactions (e.g., from the users' client devices or from an intermediate device or system), determines the time to action for each of the interactions, and then determines whether a user has performed each action within an observation period (e.g., at the time of collecting the data).

One or more users may also choose not to interact with the communication using one or more of the available actions. For example, a user may interact with the communication using one available action (e.g., open the communication), but may choose not to interact using another available action (e.g., click on a link in the communication). Similarly, the user may choose not to interact with a communication using any of the available actions. As described in more detail below, the marketing system can estimate when a user will perform an action even if the user has not performed the action within the observation period using a statistical distribution associated with the collected data.

When the users interact with the communication on the respective client devices, the client devices send interaction information to the marketing system. For example, each marketing communication can include metadata that causes the client devices to send the interaction information to the marketing system. To illustrate, the metadata can identify the type and time of the interaction with the communication, in addition to a time that the marketing system sent the marketing communication to a client device. Thus, the interaction information that the metadata identifies can include data that indicates how the users interact with the received communication and how quickly the users interacted with the communication after receiving the communication. In one or more alternative embodiments, an application (e.g., an email client, a browser, or other application) on the client device can collect the interaction information for a marketing communication.

After collecting the interaction information, the marketing system builds 204 a conversational index model representing the collected data. As used herein, the term "conversational index model" refers to a probability of users' interactions with future marketing communications based on past user interactions with marketing communications. In particular, a conversational index model allows the marketing system to score individual users based on their own interactions with past marketing communications to provide user-centric insights into the users' behaviors and interest. For example, the model allows the marketing system to determine an interest level for a user in a particular brand by calculating an interest score for the user based on the user's past interactions with marketing communications for that brand. The term "interest score" refers to a numerical value that represents a user's current conversation participation level with marketing communications that relate to a brand or product.

In one or more embodiments, building the model first includes determining 206 a parametric distribution that fits the collected interaction information. Specifically, the marketing system identifies a shape of the interaction information for an observation period and determines a distribution that fits the identified shape. For example, if the interaction information includes a shape that has the highest amount of user interactions within a short time after users receive the marketing communication and tapers off quickly, the marketing system can determine a distribution that fits the trends of the interaction information. Additionally, the marketing system can determine a distribution that most closely represents how quickly the user interactions drop off.

As previously mentioned, the marketing system can use interaction information that indicates time to action after receiving the marketing campaign. In particular, the marketing system determines dynamic data points that represent the amount of time that a plurality of users (e.g., users in a training dataset) take to perform one or more specifically identified actions related to a marketing communication. As used herein, the term "dynamic data point" represents a data point that indicates more than merely whether an action was performed. A dynamic data point also includes a variable value for a performed action. For example, a dynamic data point can indicate an amount of time that a user takes to perform a given action (e.g., time to click a communication) within an observation period. The dynamic data points allow the marketing system to capture the heterogeneity of users' interactions, which improves the targeted marketing capabilities of the marketing system.

Once the marketing system has the dynamic data points, the marketing system can determine that the dynamic data points fit to a distribution with a similar shape when displayed on a graph with the interaction information. In at least some embodiments, the distribution does not fit the dynamic data points exactly, but fits within a predetermined tolerance level based on the particular embodiment. To illustrate, the marketing system can determine that each individual dynamic data point or an average of a plurality of dynamic data points from the indication information is within a percentage of the determine distribution.

In one or more embodiments, the marketing system estimates 208 parameters of the determined distribution to allow the marketing system to characterize the distribution. The marketing system determines the parameters to be able to use the determined distribution in connection with estimating user interactions that had not yet occurred within the observation period. Additionally, the marketing system can use the parameters to generate scores for individual users based on where the user's own interactions fit along the curve of the determined distribution.

The marketing system then uses the determined distribution, with the estimated parameters, to calculate interest scores for each user of a specifically identified plurality of users. As mentioned, the interest scores provide a way for the marketing system to identify a current interest level of users in interacting with marketing communications. In one or more embodiments, the plurality of users for which the marketing system calculates scores is different from a plurality of users associated with a training dataset used to build the conversational index model. In one or more alternative embodiments, at least some of the plurality of users for which the marketing system calculates scores are also in the plurality of users associated with the training dataset.

In one or more embodiments, the marketing system calculates the interest scores for the users by analyzing past user's interactions with marketing communications that the users received. Specifically, the marketing system uses the estimated parameters to calculate a score for each user based on the dynamic data points that the marketing system collected for the users. To illustrate, the marketing system can use dynamic data points that indicate how long after receiving a communication until the users performed one or more actions to calculate probabilities based on the distribution.

According to one or more embodiments, the marketing system calculates an interest score for a user by measuring 210 a central tendency, or average probability, of a specific number of recent interactions between the user and marketing communications. Specifically, the marketing system uses the distribution and corresponding parameters to calculate 212 the cumulative probability of interactions by the user for a plurality of marketing communications. The marketing system then averages the cumulative probability over a plurality of marketing campaigns (i.e., the plurality of marketing communications) to determine the interest score for the user. The marketing system can store the calculated interest score in a conversational index for the user.

Additionally, the marketing system can use information associated with actions that users have not performed in calculating the interest scores. For example, the marketing system can estimate how long until a user will perform an action that the user did not perform within the observation period using the distribution and corresponding parameters. To illustrate, the marketing system can use the distribution to estimate that the user would perform a specific action within a certain amount of time after receiving the communication based on the distribution of actions that the user and other users actually performed within the observation period. Thus, the marketing system can factor unperformed actions into the calculation of interest scores.

According to at least some embodiments, after the marketing system generates the conversational index model, the marketing system then segments 214 the users into different segments based on the calculated interest scores for designing different campaign strategies. The marketing system uses the segments to design different campaign strategies to maximize the effectiveness of the campaigns for each segment. For example, the marketing system uses the calculated scores to identify segments of users who are more likely to engage and provides a higher number of marketing communications to those segments than to other segments. By customizing the amount of marketing communications that each segment of users receives based on the relative interests of the users in the segments, the marketing system can reduce brand fatigue while still engaging with users who are more likely to engage in return.

In one or more embodiments, the marketing system can separate the users into different segments in response to input from a marketer. For example, the marketing system can provide data associated with the conversational index model to the marketer for the marketer to view and segment the users. To illustrate, the marketer can use the provided data to segment the users by selecting a specific action (e.g., time to click) in relation to the conversational indices for the users. The marketer can view which segments of users interact most often with marketing communications and design marketing campaign strategies that target those segments of users.

After the marketing system segments the users, the marketing system can generate and/or select marketing communications to send to users. For example, the marketing system selects a marketing communication associated with a selected marketing campaign and sends the marketing communication to a plurality of users based on a campaign strategy. The campaign strategy can involve sending marketing communications to users based on the calculated interest scores for the users. Specifically, the marketing system can send marketing communications to users based on the level of interest that the users have in conversing with a corresponding brand.

In one or more embodiments, the marketing system sends communications (i.e., instances of the communications) to some users or all users based on the interest scores. For example, the marketing system can send different amounts of communications to different users based on how likely the users are to interact with the communications without experiencing brand fatigue (e.g., without the users opting out of receiving additional communications). To illustrate, the marketing system sends a first marketing communication for a brand to a segment of users who have the highest interest scores. The marketing system then sends a second marketing communication for the brand to the segment of users who have the highest interest scores and also to a segment of users with lower interest scores. Thus, the marketing system can tailor the quantity of communications that users receive based on their past interactions with a brand.

After receiving a marketing communication, a user can perform a variety of actions, as mentioned previously. For example, as mentioned, the users can interact with the marketing communication by clicking on the communication (or otherwise selecting the communication), opening the communication, clicking on content within the communication, or purchasing goods or services related to the communication (i.e., a conversion). In one or more embodiments, after a user receives a marketing communication, the marketing system updates the user's interest score based on actions that the user performs or does not perform within an observation period. If the user's interactions with the brand have changed, the marketing system can update the user's interest score to reflect the changes. When segmenting users and determining whether to provide communications to a user, the marketing system thus uses the user's most recently updated interest score.

As previously mentioned, the marketing system collects interaction information for selected marketing communications or for specifically identified observation periods. In particular, the marketing system determines an observation period based on when the marketing system sends a marketing communication to the users. For example, the marketing system can set the observation period to be a predetermined amount of time after sending the marketing communication. In one or more implementations, the marketing system sets the observation period to be the same amount of time for each marketing communication sent to the users.

Alternatively, the marketing system can set the observation period independently from receipt of marketing communications. For example, the marketing system can set the observation period to be a specific time frame in which the marketing system collects data for a plurality of marketing communications. Thus, the dynamic data points associated with each user's interactions with marketing communications can begin and end at different times within the observation period.

As described above, the marketing system can collect data that indicates actions that users performed within the observation period. The marketing system can also determine estimated data for actions performed after the observation period. Specifically, the marketing system can estimate user interactions with marketing communications after the observation period by assuming that actions occurring outside of the observation period correspond to right censored data points. Right censoring data points associated with an action performed outside the observation period allows the marketing system to use the distribution that fits the interaction information that occurred within the observation period to estimate the user interactions that did not occur within the observation period.

Figure 3:
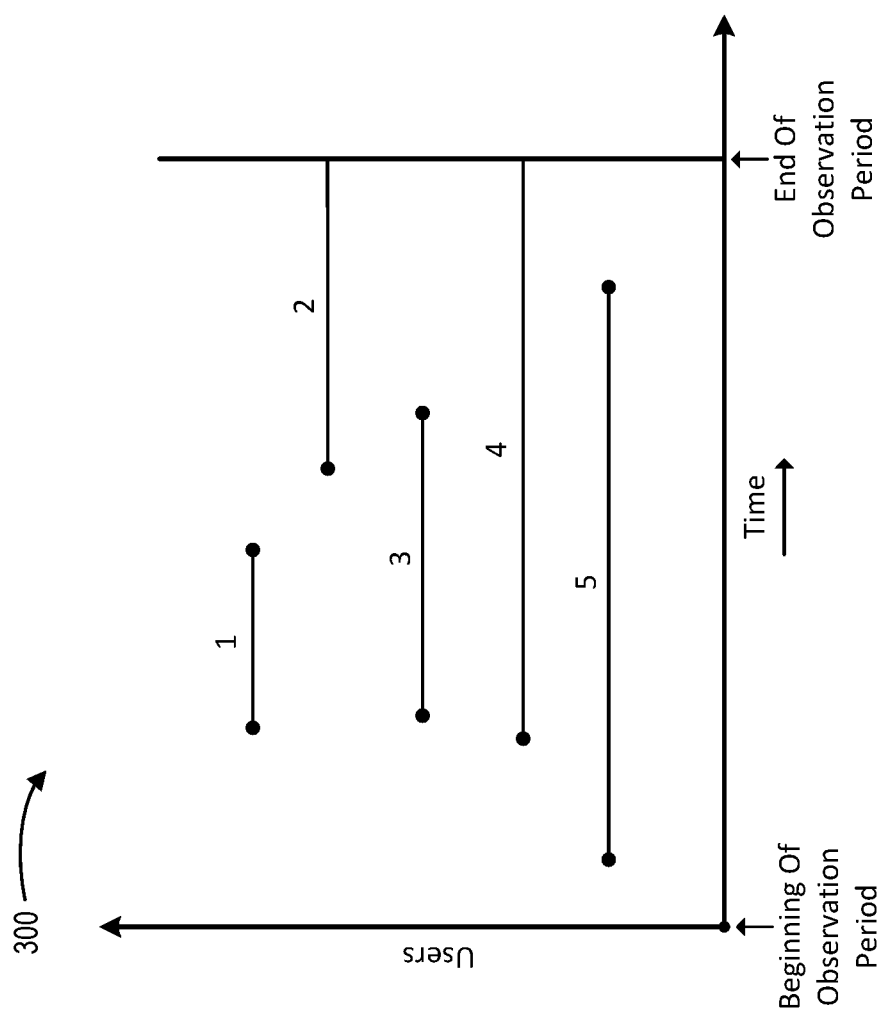
FIG. 3 illustrates a graph diagram of collected data for a marketing observation period in accordance with one or more embodiments.

FIG. 3 illustrates a graph diagram 300 of a plurality of data points indicating user interactions associated with a marketing campaign. Specifically, the graph diagram illustrates dynamic data points associated with an action that users can perform to interact with a marketing communication, as described previously. For example, the dynamic data points indicate an amount of time that the users take to perform the action within an observation period.

The graph diagram includes a plurality of dynamic data points for a plurality of different users. Each user receives a marketing communication at some point during the observation period. The marketing communication that each user receives may be the same marketing communication for the same brand, one or more different marketing communications for the same brand, or one or more different marketing communications for a variety of different brands. The observation period of FIG. 3 is a set amount of time (e.g. 10 days) in which the marketing system collects interaction information for a plurality of users in connection with a plurality of marketing communications.

As illustrated, a first set of users (users 1, 3, 5) each received a marketing communication and interacted with the marketing communication within the observation period. Specifically, the first set of users receives the marketing communications at different times and interacted with the marketing communications at different times within the observation period. Additionally, each user from the first set of users can interact with the marketing communications at different times relative to receiving the marketing communications. The marketing system can determine the dynamic data points for the interactions because the first set of users interacted with the marketing communications within the observation period.

A second set of users (users 2, 4) received marketing communications within the observation period. The second set of users, however, did not interact with the marketing communications within the observation period. As with the first set of users, the second set of users received the marketing communications at different times. Because the second set of users did not interact with the marketing communications within the observation window, the data points for the second set of users are right censored in the graph diagram. Additionally, the marketing system estimates the dynamic data points, rather than identifying the actual dynamic data points.

As previously described, the marketing system generates a conversational index model that includes as distribution with a curve that fits the collected dynamic data points. Specifically, the marketing system can first determine the distribution based on the dynamic data points for actions performed within the observation period. The marketing system then estimates the dynamic data points for actions that did not occur within the observation period using the distribution.

In one or more embodiments, the marketing system uses survival analysis, which models time to a specific event, such as a specific user interaction associated with a marketing communication. Based on an assumption that users are less likely to perform the specific user interaction as time passes, one or more embodiments of the marketing system fit the dynamic data points to a parametric Weibull distribution. Additionally, the marketing system is able to estimate unperformed actions using right censored data points.

Accordingly, the marketing system considers a time window within which K campaigns are sent and the $k^{th}$ campaign is received by $n_k$ users. The outcome of a marketing communication for the $k^{th}$ campaign is observed for a period of time (i.e., within the observation period). An indicator that identifies whether the users performed an action within the observation period is represented as $\partial_i$ for the $i^{th}$ observation, where the indicator has a value of 1 if the action is observed within the observation period or a 0 otherwise. The likelihood function for the $k^{th}$ campaign is defined as:

$$L_k = \prod_{i=1}^{n_k} [f(t_i, \alpha_k, \lambda_k)]^{\partial_i} [1 - f(t_i, \alpha_k, \lambda_k)]^{1-\partial_i}$$

Additionally, the Weibull distribution is represented as:

$$f(t, \alpha, \lambda) = \left(\frac{\alpha}{\lambda}\right)\left(\frac{t}{\lambda}\right)^{\alpha-1} e^{-\left(\frac{t}{\lambda}\right)^\alpha}; \alpha, \lambda > 0$$

where t is the time to action from the time to delivery, and $\alpha_k$ and $\lambda_k$ are parameters of the $k^{th}$ Weibull distributions estimated using Maximum Likelihood Estimation (MLE). For the right censored observations, where on action is observed within the observation period, t is the time to the end of the observation period from the time when the users received the marketing message.

After learning the K pairs of parameters, the marketing system uses the distributions and parameters to determine the computational indices for the users. Specifically, the marketing system calculates a score for each user for each of the campaigns that the users received out of the K campaigns. To illustrate, assume that the $j^{th}$ user received $m_j$ campaigns of the K campaigns. For that user, the time to action (or the corresponding right censored time) is $T_1$, $T_2, \ldots T_{m_j}$. For the actions that occur within the observation period, the marketing system calculates a score represented as $P_{jk}=Pr(t>T_{jk}|\alpha_k,\lambda_k)$ for the $j^{th}$ user and $k^{th}$ campaign. For the right censored actions, the estimated time to open is represented as $T^*_{jk}=E(t|t>T_{jk})$, and the marketing system calculates a score represented as $P_{jk}=Pr(t>T^*_{jk}|\alpha_k,\lambda_k)$. A total interest score for the $j^{th}$ user is thus estimated as:

$$\frac{\sum_{k=1}^{m_j} P_{jk}}{m_j}.$$

In other words, the marketing system calculates the scores for each user and each campaign by determining a probability associated with a particular action for a user. The probability is represented as an area beneath the distribution curve after a time associated with the particular action. The interest score is an average of probabilities for the user across a plurality of identified marketing campaigns. Actions that are performed more quickly after receiving a marketing communication have a higher probability value than actions performed more slowly. Thus, actions performed soon after the user receives a marketing communication have high interest scores to reflect a higher interest or interactivity of the user in connection with the marketing communication.

After the marketing system has generated an interest score for each user, the marketing system provides the interest scores to a marketer. The marketer can use the interest scores to segment the users into groups of users that have similar interactivity levels with a brand. For example, the marketer can separate the users into segments with high interest scores, medium interest scores, and low interest scores. The marketer can also target each segment of users differently than the other segments. To illustrate, the marketer can cause the marketing system to send more different types of marketing communications or different amounts of marketing communications to each of the different segments.

Experimental data for one embodiment of the marketing system described herein included approximately 2.1 million users, each receiving approximately twenty-one email campaigns. For characterizing the distribution, the marketing system used the interaction information of users for the first sixteen campaigns as a training and testing dataset, and observed the behavior and scored the same users for the remaining five campaigns as a validation sample. The marketing system may select the training and testing dataset and the validation sample randomly from a plurality of marketing campaigns for a plurality of users and identified actions. The marketing system collected the data for the experiment using ADOBE CAMPAIGN®. "ADOBE" and "ADOBE CAMPAIGN" are registered trademarks of Adobe Systems Incorporated in the United States and/or other countries.

Figure 4B:
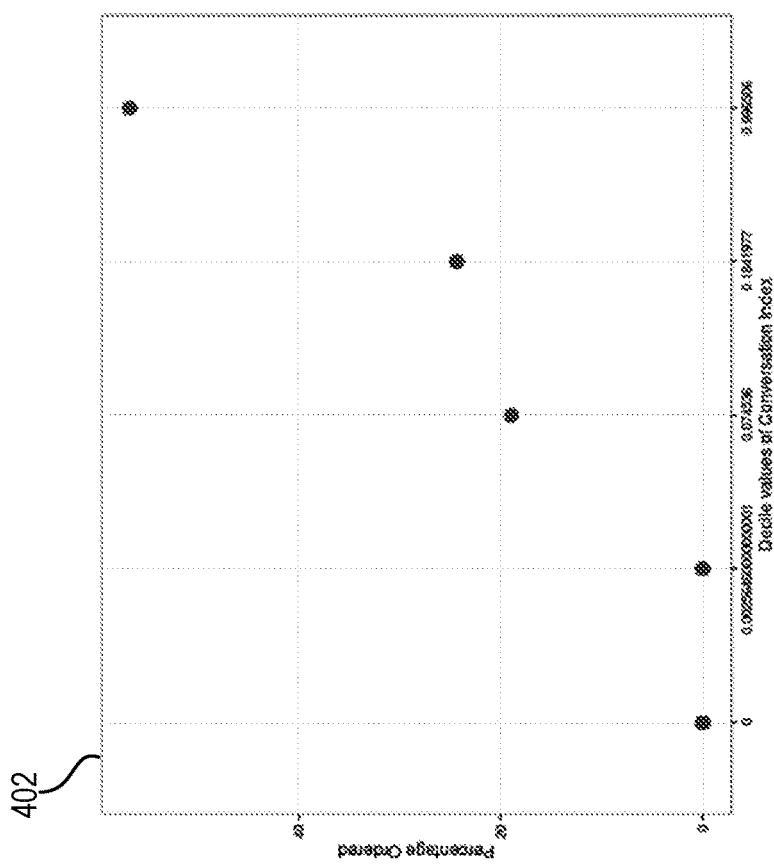
FIGS. 4A-4D illustrate a plurality of graph diagrams correlating generated indices to segments of consumers based on observed consumer behavior for a plurality of marketing campaigns in accordance with one or more embodiments.
Figure 4A:
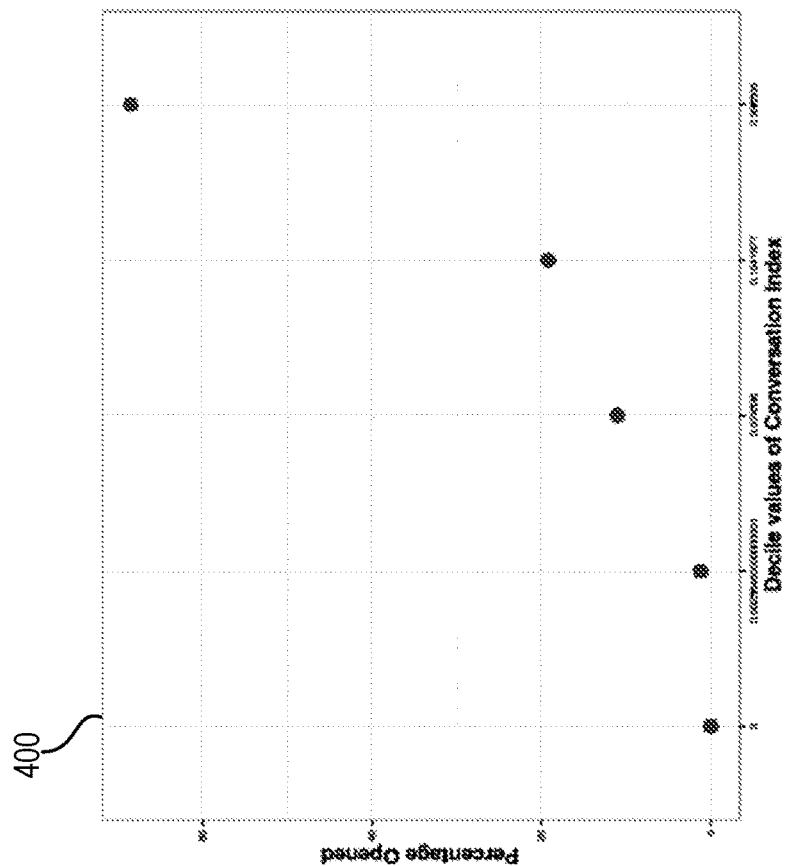

FIGS. 4A-4D illustrate graph diagrams that illustrate relationships between various marketing data and the conversational indices of a plurality of users. Specifically, FIG. 4A illustrates a graph diagram 400 that illustrates the relationship between emails opened and the conversational index (i.e., the interest score) of the users. Specifically, the graph diagram indicates the percentage of marketing emails that were opened in relation to the interest scores of the users. For the illustrated example, although the graph diagram includes only five decile segments, 60% of the users have no interest score (i.e., the users have not interacted with any emails recently). Additionally, the marketing system identified 20% of the users who perform approximately 90% of the open actions as the top two deciles with the highest interest scores. The top decile performs over 60% of the email open actions.

FIG. 4B illustrates a graph diagram 402 that illustrates the relationship between conversions (i.e., purchases) and the conversational index of the users. In particular, the graph diagram indicates the percentage of purchases that occurred in relation to the interest scores of the users. For the illustrated example, the marketing system identified 20% of the users who make ~80% of the purchases after opening a marketing email. The top decile makes over 50% of the purchases after opening an email.

Figure 4D:
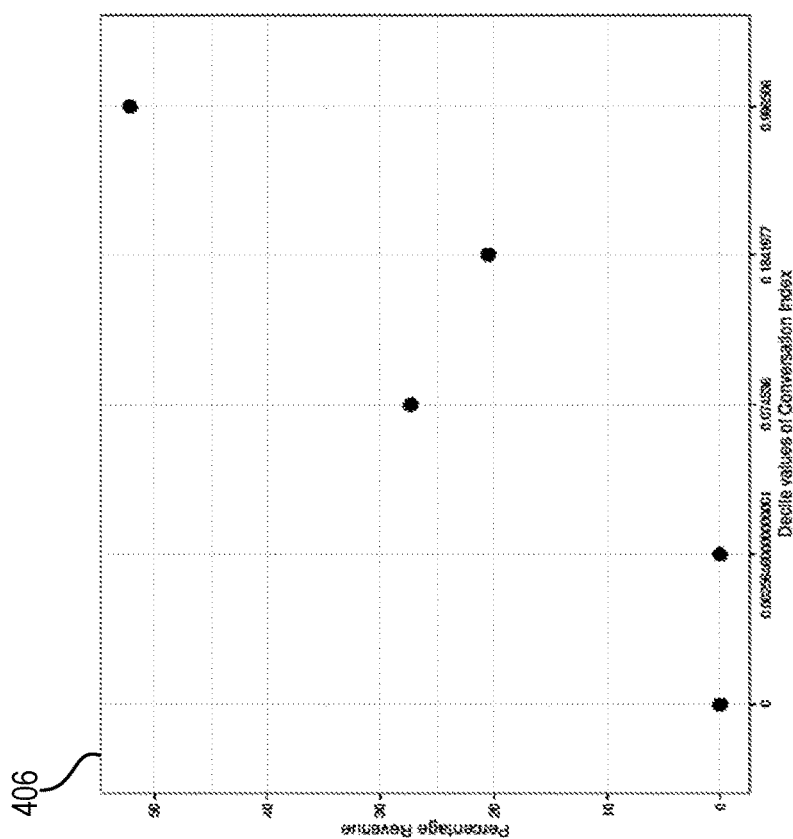
Figure 4C:
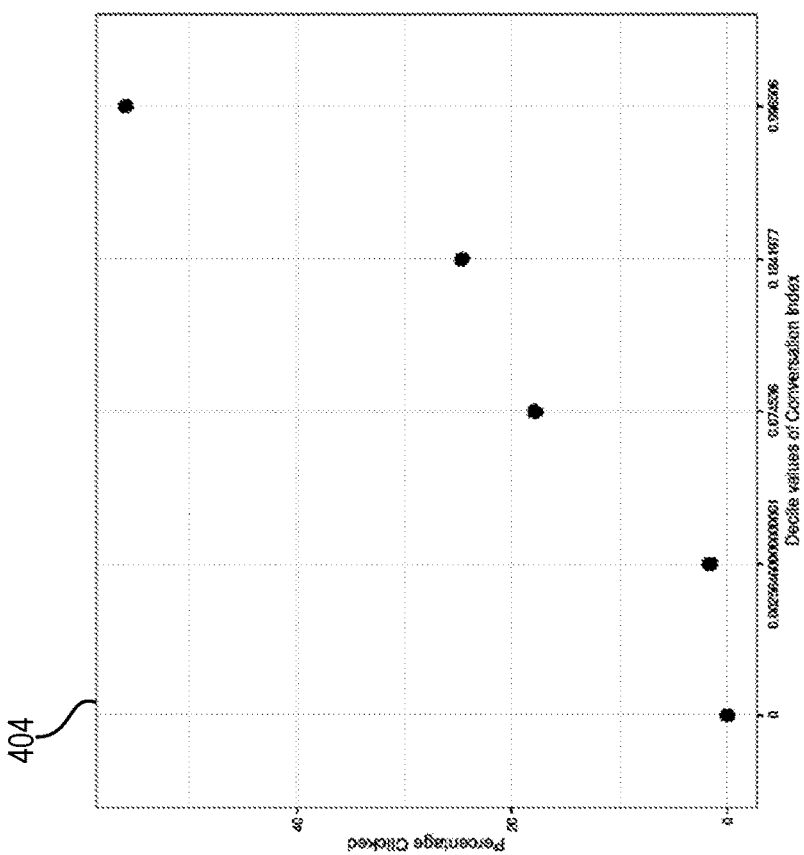

FIG. 4C illustrates a graph diagram 404 that illustrates the relationship between clicks and the conversational index of the users. Specifically, the graph diagram indicates the percentage of email clicks that occurred in relation to the interest scores of the users. As illustrated, the top 20% of users with the highest interest scores performed ~80% of the email clicks, similar to the email open actions and purchases made. The third decile also performs a noticeable amount of the email clicks, while the remaining 70% of the users either do not interact with the emails at all, or interact very little.

FIG. 4D illustrates a graph diagram 406 that illustrates the relationship between total revenue generated from the marketing campaigns and the users' conversational indices. In particular, the graph diagram indicates that, for the users in the validation sample, the top 20% of users with the highest index scores generated approximately 75% of the revenue. Although the graph diagram of FIG. 4D illustrates that the third decile produced more revenue than the second decile, despite having lower open, click, and conversion rates, the generated revenue generally followed the relationships between the specified user interactions and the users' conversational indices.

Although the experimental embodiment included certain numbers of campaigns and users, the marketing system can use any number of users, campaigns, and types of communications in the training dataset. For example, the marketing system can generalize or extend the conversational index model to different conversations. To illustrate, the marketing system can adapt the model to focus on different types of communications, more than one brand, or specific user segments, as may serve a particular embodiment.

As illustrated in the experimental results, the conversational indices for the users provide useful marketing insights to allow marketers to identify the users that interact the most with marketing emails and also generate the highest amounts of revenue. By targeting the top deciles of users with the highest interest scores, marketers can reduce the workload on email servers by sending emails to the users who are most likely to interact and not sending marketing emails to those with zero interest scores. Alternatively, the marketers can reduce the number of marketing emails that the marketing system sends to users segments with lower interest scores to attempt to retain some brand awareness with the users, while avoiding brand fatigue. Furthermore, as user interest changes, the marketing system can update the interest scores for users to allow marketers to adapt marketing strategies.

In one or more additional embodiments, segmenting users allows for associating different marketing strategies with different segments of users. Specifically, marketers can identify a first set of users who are most likely to positively interact with a marketing campaign, and the marketer can associate the first set of users with a first marketing strategy. Additionally, the marketers can identify a second set of users who may be less likely to positively interact with the marketing campaign, and the marketer can associate the second set of users with a second marketing strategy. The first marketing strategy may involve providing a higher volume of marketing communications than the second marketing strategy. Thus, the marketer can target the segments differently so as to maximize the marketing effectiveness for each segment.

In one or more embodiments, applying different marketing strategies to different segments allows the marketing system to provide different amounts of marketing communications to different segments. For example, a first marketing strategy associated with a first set of users with high interest scores can cause the marketing system to provide a first set of marketing communications to the first set of users. To illustrate, the first set of marketing communications can include a first set of marketing emails. A second marketing strategy associated with a second set of users with lower interest scores can cause the marketing system to provide a second set of marketing communications to the second set of users. To illustrate, the second set of marketing communications can include a subset of the first set of marketing emails, such that the second set of users receives fewer marketing emails than the first set of users.

Alternatively, different marketing strategies can cause the marketing system to provide different types of marketing communications to different segments. Specifically, interest scores can indicate that certain users are more likely to interact with certain types of marketing communications over others. For instance, based on the interest scores for a plurality of users, the marketing system can provide a first type of marketing communications (e.g., emails) to a first set of users, and a second type of marketing communications (e.g., text messages) to a second set of users. In another example, the marketing system can provide mixed communication types to a first set of users and a single communication type to a second set of users.

In one or more embodiments, the marketing system can apply different marketing strategies by varying the content provided to different segments. For example, the marketing system generates interest scores for the users in connection with the content of the marketing communications, allowing the marketing system to further customize marketing strategies. In particular, some users may be more likely to positively interact with certain content (e.g., video content) than other types of content (e.g., text content), while other users may be more likely to positively interact with the text content than the video content. Thus, the marketing system can provide marketing communications with the preferred content types to each of the segments based on the interest scores.

Furthermore, because different interest scores can indicate the likelihood of different actions by users, the marketing system can apply different marketing strategies based on different interest scores and corresponding segments of users. For example, the marketing system and apply a first marketing strategy to a first segment of users that are most likely to open a marketing communication, a second marketing strategy to a second segment of users that are most likely to click on a marketing communication, and/or a third marketing strategy to a third segment of user that are most likely to purchase a product or service promoted by a marketing communication. One will appreciate that, in the foregoing example, the segments of users may overlap, and a particular user may be multiple of the first, second, and third segments. Accordingly, for this particular user, the marketing system can intelligently apply one or more of the marketing strategies based on the desired result (e.g., the desired action) from the user.

Figure 5:
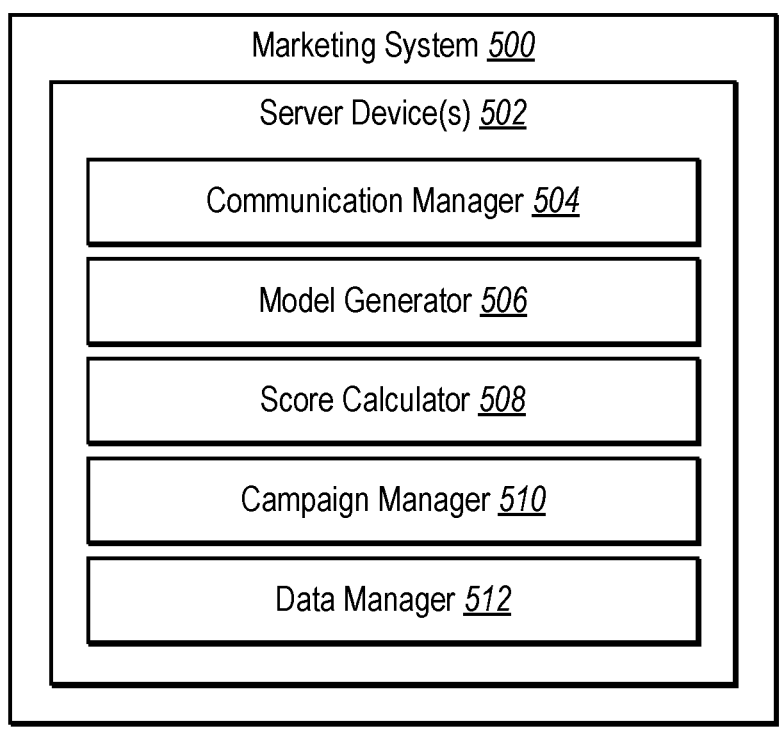
FIG. 5 illustrates a schematic diagram of a marketing system in accordance with one or more embodiments.

As described above, a marketing system can improve targeted marketing using consumer-level interaction information. FIG. 5 illustrates a schematic diagram of a marketing system 500 including server device(s) 502 for performing one or more operations of the marketing system 500 described herein. The marketing system 500 can include, but is not limited to, a communication manager 504, a model generator 506, a score calculator 508, a campaign manager 510, and a data manager 512. Although the marketing system 500 of FIG. 5 is depicted as having various components, the marketing system 500 may have any number of additional or alternative components. Additionally, although FIG. 5 illustrates the marketing system 500 including the components on server device(s) 502, the marketing system 500 can include one or more of the illustrated components on a single client device.

In one or more embodiments, each of the components of the server device(s) 502 can be in communication with one another using any suitable communication technologies. Although the components of the marketing system 500 are shown to be separate in FIG. 5, any of the components may be combined into fewer components, such as into a single component, or divided into more components as may serve a particular implementation. Furthermore, although the components of FIG. 5 are described in connection with the marketing system 500, at least some of the components for performing operations in conjunction with the marketing system 500 described herein may be implemented on other devices and/or with other systems.

The components of the marketing system 500 can include software, hardware, or both. For example, the components of the marketing system 500 (e.g., the communication manager 504, the model generator 506, the score calculator 508, the campaign manager 510, and the data manger) can include on or more instructions stored on a computer-readable storage medium and executed by processors of one or more computing devices such as the server device(s) 502. When executed by the one or more processors, the computer-executable instructions of the marketing system 500 can cause the computing devices to perform the marketing processes described herein. Alternatively, the components of the marketing system 500 can comprise hardware, such as a special purpose processing device to perform specific functions associated with marketing processes. Additionally, the components of the marketing system 500 can comprise a combination of computer-executable instructions and hardware.

Furthermore, the components of the marketing system 500 performing the functions described herein with respect to the marketing system 500 may, for example, be implemented as part of a stand-alone application, as a module of an application, as part of a suite of applications, as a plug-in for applications including content creation applications, as a library function or functions that may be called by other applications, and/or as a cloud-computing model. Thus, the components of the marketing system 500 may be implemented as part of a stand-alone application on a personal computing device or a mobile device. Alternatively or additionally, the components of the object digitizing system 500 may be implemented in any application that allows delivery of content to users, including, but not limited to, applications in ADOBE® CREATIVE CLOUD® and ADOBE® PHOTOSHOP®. "ADOBE", "CREATIVE CLOUD", and "PHOTOSHOP" are registered trademarks of Adobe Systems Incorporated in the United States and/or other countries.

As previously described, the marketing system 500 of FIG. 5 includes a communication manager 504 to facilitate communication between the server device(s) 502 and client devices of users. Specifically, the communication manager 504 allows the server device(s) 502 to communicate with any number of client devices to send marketing communications to users. Additionally, the communication manager 504 facilitates that collection of dynamic data associated with the marketing communications from the client devices of users and/or other intermediate devices that collect the data from the client devices.

The marketing system 500 includes a model generator 506 that facilitates the generation of a model to determine the likelihood of users interacting with marketing communications. In particular, the model generator 506 identifies one or more distributions that fit to information that the communication manager 504 receives from the client devices, as described previously. The model generator 506 analyzes the received information to determine the distribution and also determines a plurality of parameters for the distribution.

The marketing system 500 also includes a score calculator 508 for calculating interest scores for users who have received marketing communications. The score calculator 508 uses the dynamic data associated with a plurality of users and the plurality of parameters for the distribution to identify the interest scores. Specifically, the score calculator 508 averages probabilities associated with user interactions across a plurality of marketing campaigns to determine the interest score for each user. Additionally, the score calculator 508 estimates probabilities associated with user interactions that occur outside an observation period for determining the interest scores.

The marketing system 500 includes a campaign manager 510 to manage a plurality of marketing campaigns. In particular, the campaign manager 510 generates or otherwise accesses marketing communications to send to the client devices of users. For example, the campaign manager 510 can access the marketing communications from the data manager 512. Alternatively, the campaign manager 510 can receive input from marketers who generate the marketing communications or the content within the marketing communications. The campaign manager 510 can also manage a list of users for sending the marketing communications and for collecting data associated with the marketing communications.

The marketing system 500 also includes a data manager 512 to manage data that the other components in the marketing system 500 use and/or produce. Specifically, the data manager 512 can communicate with the other components in the marketing system 500 (i.e., the communication manager 504, the model generator 506, the score calculator 508, and the campaign manager 510) to obtain data that the components have produced for storage and/or use by one or more of the components. To illustrate, the data manager 512 can store data that includes, but is not limited to, marketing communications, a database of users, user interaction information collected from the users' client devices, user interest scores, and/or other information associated with the operation of the marketing system 500.

FIGS. 1-5, the corresponding text, and the examples, provide a number of different systems and devices for consumer-centric marketing. In addition to the foregoing, embodiments can be described in terms of flowcharts comprising acts and steps in a method for accomplishing a particular result. For example, FIGS. 6 and 7 illustrate flowcharts of exemplary methods in accordance with one or more embodiments.

Figure 6:
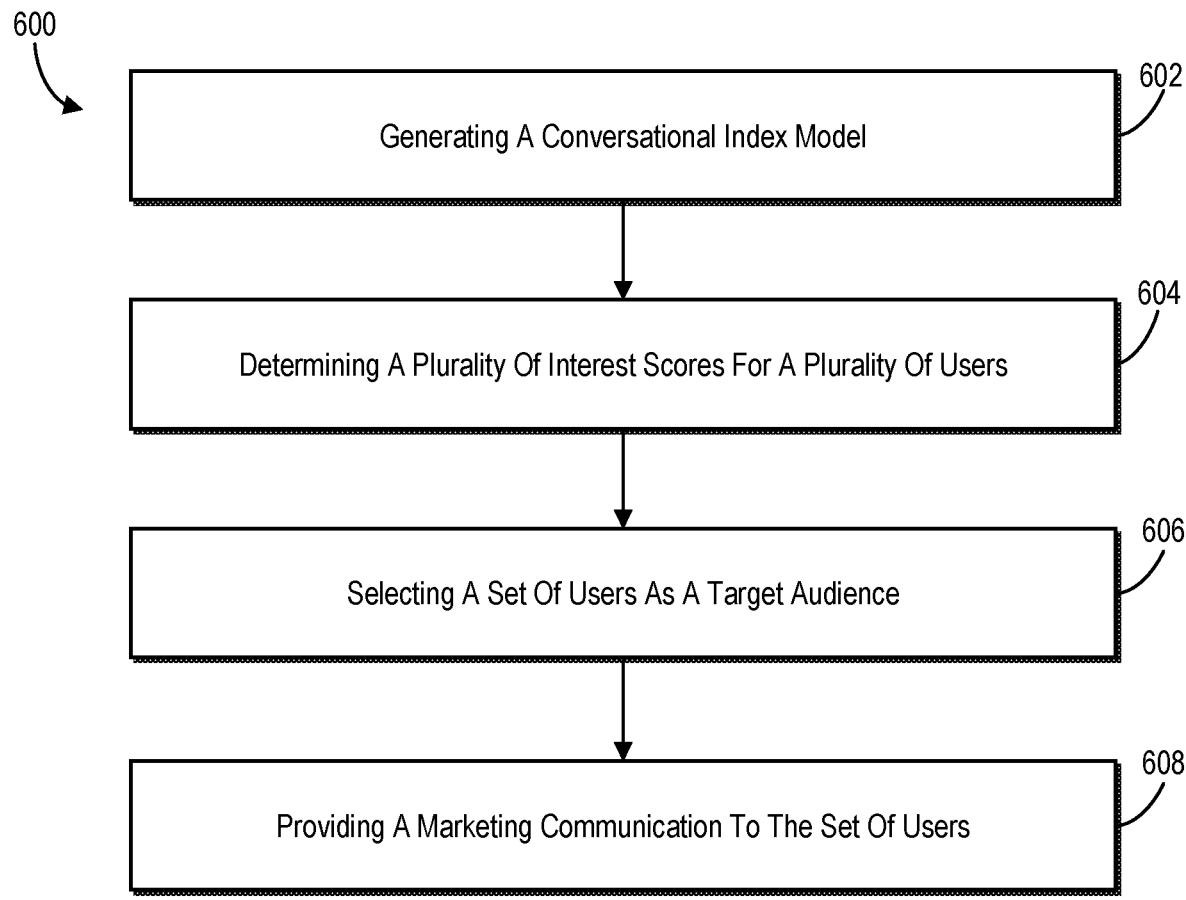
FIG. 6 illustrates a flowchart of a series of acts in a method of consumer-centric indexing for marketing campaigns in accordance with one or more embodiments.
Figure 7:
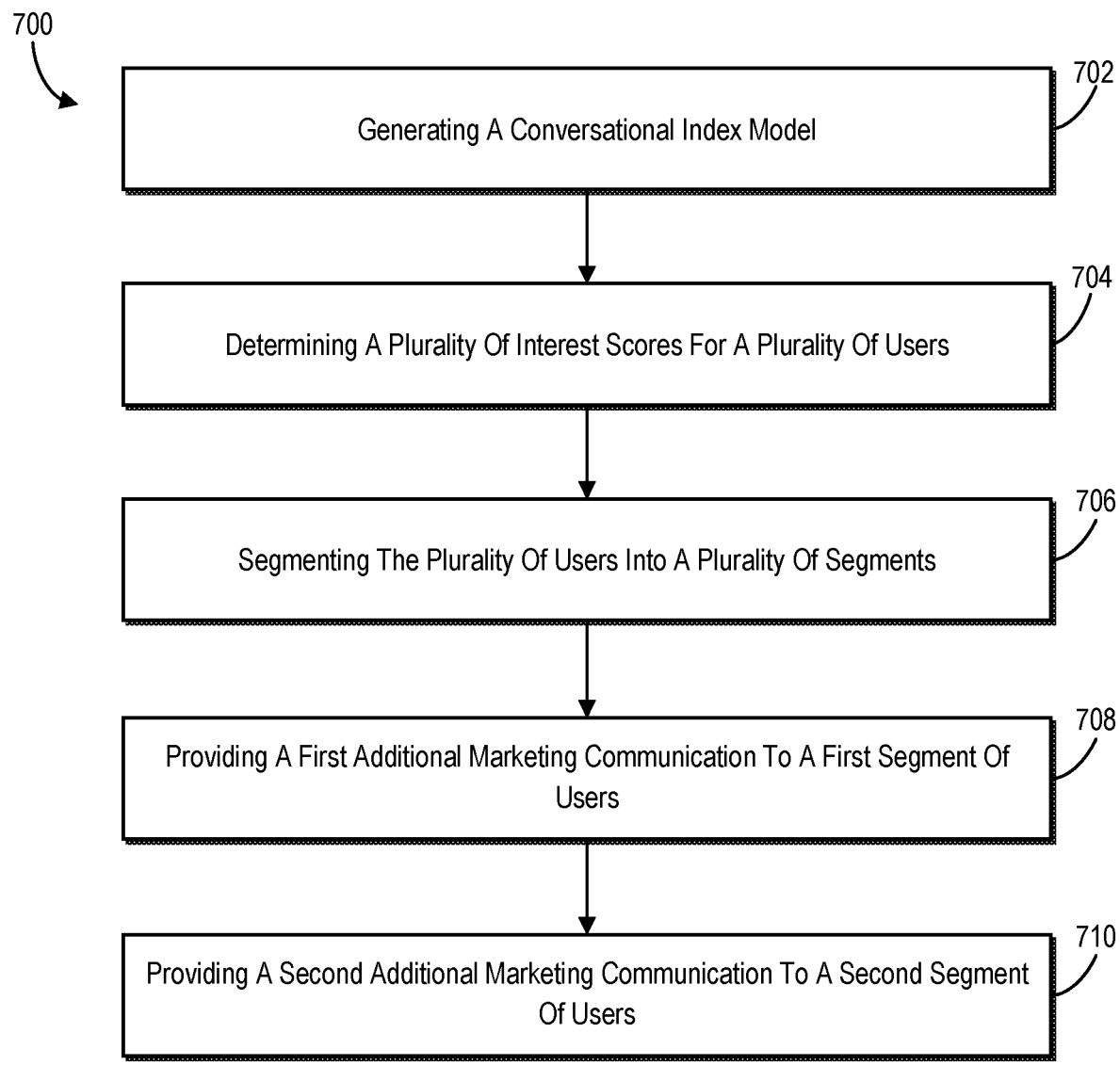
FIG. 7 illustrates a flowchart of a series of acts in another method of consumer-centric indexing for marketing campaigns in accordance with one or more embodiments.

FIG. 6 illustrates a flowchart of a series of acts in a method 600 of consumer-centric indexing for marketing campaigns. The method 600 includes an act 602 of generating a conversational index model. For example, act 602 involves analyzing a plurality of dynamic data points associated with a set of past marketing campaigns, wherein each dynamic data point from the plurality of dynamic data points indicates a period of time between a user receiving a marketing communication and the user performing an action associated with the marketing communication. Act 602 also involves determining a distribution that corresponds to the plurality of dynamic data points, and determining a plurality of parameters for the determined distribution. Act 602 can involve selecting the plurality of dynamic data points based on a connection of the plurality of dynamic to a particular brand.

The method 600 includes an act 604 of determining a plurality of interest scores for a plurality of users. Act 604 can involve identifying an action associated with a marketing communication from a marketing campaign, determining, for the identified action, a probability as a percentage of an area beneath a curve of the determined distribution after a time of the identified action, and averaging, for the user, a plurality of probabilities for a plurality of actions to determine an interest score for the user. For example, act 604 can also involve determining the interest score for the user based on a plurality of scores for a plurality of actions across a plurality of marketing communications associated with a plurality of marketing campaigns.

As part of act 604, or as an additional act, the method 600 can include determining, for an action not performed by the user within an observation window, an amount of time until the action will likely be performed by the user. The method 600 can also include determining, for the action not performed by the user, a probability as an area beneath the curve of the determined distribution based on the determined amount of time. The method 600 can further include determining, for the user, an interest score for the user based on a probability for a performed action and a probability for an unperformed action.

The method 600 can also include generating a training dataset comprising a plurality of dynamic data points associated with a first set of past marketing campaigns for the plurality of users, generating the conversational index model based on the training dataset, and determining a plurality of interest scores for the plurality of users associated with the training dataset using a second set of past marketing campaigns.

Additionally, the method 600 includes an act 606 of selecting a set of users as a target audience. For example, act 606 involves selecting, based on the calculated plurality of interest scores, a set of users from the plurality of users as a target audience. Act 606 can involve selecting the set of users from the plurality of users as a target audience, the selecting comprising selecting a set of users having interest scores that meet a predetermined threshold.

Act 606 can involve selecting, from the plurality of users who have received a marketing communication, a first set of users with a first range of interest scores as a first target audience, and selecting, from the plurality of users who have received a marketing communication, a second set of users with a second range of interest scores as a second target audience.

The method 600 also includes an act 608 of providing a marketing communication to the set of users. For example, act 608 involves providing, to the selected set of users, a marketing communication associated with a marketing campaign. Act 608 can involve providing the determined plurality of interest scores to a managing client device, and receiving, from the managing client device, a selection to associate a first marketing strategy with the first set of users and a second marketing strategy with the second set of users.

Act 608 can also involve providing a customized marketing communication based on the selected set of users. Act 608 can also involve refraining from providing the marketing communication to other users not part of the target audience.

The method 600 can also include receiving, for the user, an additional dynamic data point associated with an action by the user in connection with an additional marketing communication, and updating the interest score for the user based on the additional dynamic data point.

FIG. 7 illustrates a flowchart of a series of acts in a method 700 of consumer-centric indexing for marketing campaigns. The method 700 includes an act 702 of generating a conversational index model. For example, act 702 involves generating a conversational index model that indicates a probability of user interactions. Act 702 can involve training the conversational index model using a training dataset based on dynamic data points associated with a first set of past marketing campaigns for the plurality of users.

As part of act 702, the method 700 includes analyzing a plurality of dynamic data points associated with a set of past marketing campaigns, wherein a dynamic data point from the plurality of dynamic data points indicates a period of time between a user receiving a marketing communication and the user performing an action associated with the marketing communication. For example, act 702 can involve selecting the plurality of dynamic data points in connection with a plurality of past marketing campaigns for a brand. Alternatively, act 702 can involve selecting the plurality of dynamic data points in connection with a plurality of past marketing campaigns for a plurality of different brands.

Additionally, act 702 involves determining a distribution that corresponds to the plurality of dynamic data points. For example, act 702 involves determining a Weibull distribution that fits to the plurality of dynamic data points. Act 702 also involves determining a plurality of parameters for the determined distribution. For example, act 702 involves determining a plurality of parameters of the Weibull distribution that fits to the plurality of dynamic data points. Act 702 can also involve using the plurality of parameters to extend the determined distribution beyond an observation period associated with the plurality of dynamic data points The method 700 also includes an act 704 of determining a plurality of interest scores for a plurality of users. For example, act 704 involves determining, based on the conversational index model, a plurality of interest scores for a plurality of users who have received a marketing communication associated with a marketing campaign. Act 704 can involve determining a plurality of interest scores for the plurality of users associated with the training dataset using a second set of past marketing campaigns.

Act 704 can involve identifying, for a particular marketing communication, an action performed by a user from the plurality of users within an observation period and an action not performed by the user within the observation period. Act 704 can involve identifying, for an action not performed by the user within an observation period, an amount of time until the action will likely be performed by the user, determining, for the action not performed by the user, a probability as a percentage of an area beneath a curve of the determined distribution based on the determined amount of time, and determining, for the user, an interest score for the user based on a probability for a performed action and a probability for an unperformed action.

Alternatively, act 704 can involve determining a first probability for the action performed by the user within the observation period, determining a second probability for the action not performed by the user within the observation period, and determining the first probability and the second probability to calculate an interest score for the user.

The method 700 further includes an act 706 of segmenting the plurality of users into a plurality of segments. For example, act 706 involves segmenting, based on the calculated plurality of interest scores, the plurality of users into a plurality of segments. Act 706 can involve segmenting users having interest scores that meet a threshold into a first segment and users having interest scores that do not meet the threshold into a second segment. For example, act 706 can involve receiving the threshold from a managing client device and segmenting the users based on the received threshold. Alternatively, act 706 can involve segmenting the users into a plurality of segments. To illustrate, act 706 can involve segmenting users into deciles, quintiles, quartiles, etc. based on the calculated plurality of interest scores of the users. For example, act 706 can involve segmenting users having interest scores within a top 10% of interest scores into a first decile, and so on.

Additionally, the method 700 includes an act 708 of providing a first additional marketing communication to a first segment of users. For example, act 708 involves providing, to a first segment of users from the plurality of segments, an additional marketing communication. Act 708 can involve selecting the additional marketing communication for a brand to provide to the first segment, wherein the users in the first segment have not previously received the additional marketing communication. The first segment can include users that have interest scores within a top 10% of interest scores.

The method 700 also includes an act 710 of providing a second additional marketing communication to a second segment of users. For example, act 710 involves providing, to a second segment of users from the plurality of segments, a second additional marketing communication, wherein users in the second segment of users have lower interest scores than users in the first segment of interest scores. To illustrate, act 710 can involve providing a second additional marketing communication to the second segment of users, the second additional marketing communication being different from the first additional marketing communication.

Additionally, the method 700 can include refraining from providing the additional marketing communication to a third segment of users. For example, act 710 involves refraining from providing the additional marketing communication to a second segment of users from the plurality of segments, wherein users in the second segment of users have lower interest scores than users in the first segment of interest scores.

The method 700 can also include receiving, for the user, an additional dynamic data point associated with an action by the user in connection with an additional marketing communication, and update the interest score for the user based on the additional dynamic data point. Alternatively, the method 700 can include updating the interest score for the user after receiving a predetermined number of additional dynamic data points associated with actions by the user in connection with additional marketing communications.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
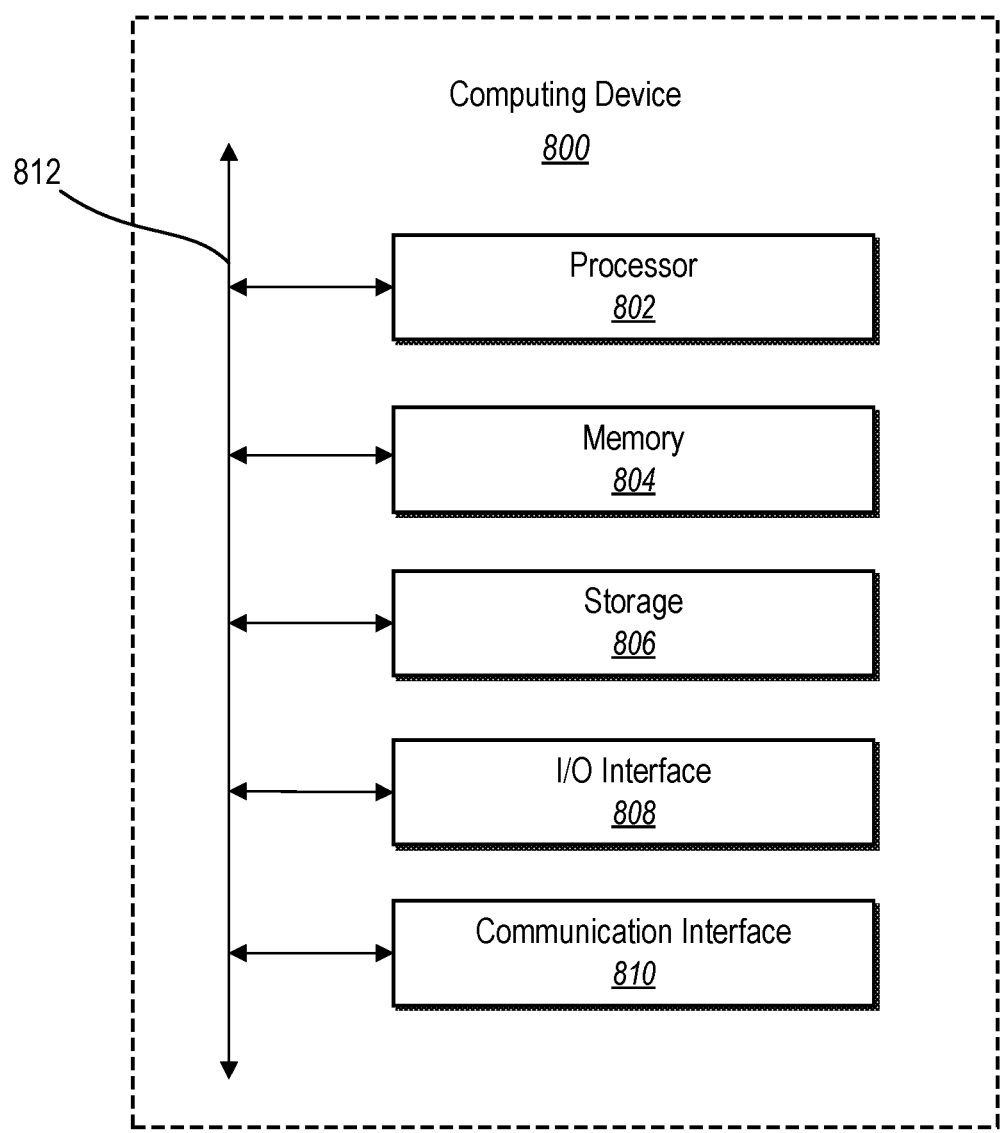
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement the marketing system 500. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions for digitizing real-world objects, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions related to object digitizing processes (e.g., digital scans, digital models).

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the digitizing processes described herein. To illustrate, the marketing process can allow a plurality of devices (e.g., server device(s) and a managing client device) to exchange information using various communication networks and protocols for exchanging user interaction information and marketing campaign information.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for consumer-centric indexing for marketing campaigns, a system comprising:
   at least one processor; and
   a non-transitory computer readable storage medium comprising instructions that, when executed by the at least one processor, cause the system to:
   generate a conversational index model, the generating comprising:
       determining, for a plurality of users who receive a marketing communication, an amount of time each user of the plurality of users takes to perform an action to interact with the marketing communication after receiving the marketing communication;
       storing the amount of time each user of the plurality of users takes to perform the action to interact with the marketing communication after receiving the marketing communication as a dynamic data point for the user, wherein a plurality of past marketing campaigns corresponds to a plurality of dynamic data points for the plurality of users;
       determining a distribution having a shape that corresponds to times to actions for the plurality of dynamic data points for the plurality of users during an observation period; and
       determining a plurality of parameters to characterize the determined distribution having the shape that corresponds to times to actions for the plurality of dynamic data points for the plurality of users during the observation period;
   generate a plurality of interest scores for the plurality of users by determining areas underneath the distribution of the conversational index model;
   select, based on the plurality of interest scores, a set of users from the plurality of users as a target audience; and
   provide, to client devices of the selected set of users in response to selecting the set of users based on the plurality of interest scores, a marketing communication associated with a marketing campaign.

2. The system as recited in claim 1, wherein the instructions that cause the system to generate the plurality of interest scores cause the system to:
   identify an action associated with a marketing communication from a marketing campaign;
   determine, for the identified action, a probability as a percentage of an area beneath a curve of the determined distribution after a time of the identified action; and
   average, for the user, a plurality of probabilities for a plurality of actions to determine an interest score for the user.

3. The system as recited in claim 2, further comprising instructions that, when executed by the at least one processor, cause the system to:

determine, for an action not performed by the user within an observation window, an amount of time until the action will likely be performed by the user;

determine, for the action not performed by the user, a probability as an area beneath the curve of the determined distribution based on the determined amount of time; and determine, for the user, an interest score for the user based on a probability for a performed action and a probability for an unperformed action.

4. The system as recited in claim 2, wherein the instructions that cause the system to determine the interest score for the user further cause the system to determine the interest score for the user based on a plurality of scores for a plurality of actions across a plurality of marketing communications associated with a plurality of marketing campaigns.

5. The system as recited in claim 2, further comprising instructions that, when executed by the at least one processor, cause the system to:

receive, for the user, an additional dynamic data point associated with an action by the user in connection with an additional marketing communication, the additional dynamic data point representing a time for the user to perform the action by the user in connection with the additional marketing communication after receiving the additional marketing communication; and update the interest score for the user based on the additional dynamic data point.

6. The system as recited in claim 1, further comprising instructions that, when executed by the at least one processor, cause the system to select the plurality of dynamic data points based on a connection of the plurality of dynamic data points to a particular brand.

7. The system as recited in claim 1, further comprising instructions that, when executed by the at least one processor, cause the system to select the set of users from the plurality of users as a target audience, the selecting comprising selecting users having interest scores that meet a predetermined threshold.

8. The system as recited in claim 1, further comprising instructions that, when executed by the at least one processor, cause the system to select the set of users from the plurality of users as a target audience, the selecting comprising:

selecting, from the plurality of users who have received a marketing communication, a first set of users with a first range of interest scores as a first target audience; and selecting, from the plurality of users who have received a marketing communication, a second set of users with a second range of interest scores as a second target audience.

9. The system as recited in claim 8, further comprising instructions that, when executed by the at least one processor, cause the system to provide a marketing communication associated with a marketing campaign, the providing comprising:

providing the determined plurality of interest scores to a managing client device; and receiving, from the managing client device, a selection to associate a first marketing strategy with the first set of users and a second marketing strategy with the second set of users.

10. The system as recited in claim 1, further comprising instructions that, when executed by the at least one processor, cause the system to:

generate a training dataset comprising a plurality of dynamic data points associated with a first set of past marketing campaigns for the plurality of users;

generate the conversational index model based on the training dataset; and determine a plurality of interest scores for the plurality of users associated with the training dataset using a second set of past marketing campaigns.

11. In a digital medium environment for consumer-centric indexing for marketing campaigns, a system comprising:

at least one processor; and a non-transitory computer readable storage medium comprising instructions that, when executed by the at least one processor, cause the system to:

determine, for a plurality of users who received a marketing communication, an amount of time each user of the plurality of users takes to perform an action to interact with the marketing communication after receiving the marketing communication;

store the amount of time each user of the plurality of users takes to perform the action to interact with the marketing communication after receiving the marketing communication as a dynamic data point for the user, wherein a plurality of past marketing campaigns corresponds to a plurality of dynamic data points for the plurality of users;

generate a conversational index model representing the plurality of dynamic data points associated with a plurality of past marketing campaigns; and determine an interest score for a user by determining an area underneath a distribution of the conversational index model that indicates a plurality of probabilities associated with actions by the user across the plurality of past marketing campaigns; and provide, to a client device of the user and based on the interest score of the user, a marketing communication associated with a marketing campaign.

12. The system as recited in claim 11, wherein the instructions that cause the system to determine the interest score for the user cause the system to:

identify, based on a dynamic data point associated with the user, an action associated with the marketing communication from a marketing campaign; and determine, for the identified action, a probability as a percentage of an area beneath a curve of the determined distribution after a time of the identified action.

13. The system as recited in claim 12, further comprising instructions that, when executed by the at least one processor, cause the system to:

determine, for an action not performed by the user within an observation period, an amount of time until the action will likely be performed by the user; and determine, for the action not performed by the user, a probability as an area beneath the curve of the determined distribution based on the amount of time until the action will likely be performed by the user; and determine, for the marketing campaign, an interest score for the user based on a probability for a performed action and a probability for an unperformed action.

14. The system as recited in claim 12, wherein the instructions that cause the system to determine the interest score for the user cause the system to determine the interest score for the user based on a plurality of scores for a plurality of actions across a plurality of marketing communications associated with a plurality of marketing campaigns.

15. The system as recited in claim 12, further comprising instructions that, when executed by the at least one processor, cause the system to:
- receive, for the user, an additional dynamic data point associated with an action by the user in connection with an additional marketing communication, the additional dynamic data point representing a time for the user to perform the action by the user in connection with the additional marketing communication after receiving the additional marketing communication; and
- update the interest score for the user based on the additional dynamic data point.

16. The system as recited in claim 11, further comprising instructions that, when executed by the at least one processor, cause the system to select a set of users from the plurality of users as a target audience, the set of users having interest scores that meet a predetermined threshold and comprising the user.

17. A non-transitory computer readable storage medium comprising instructions that, when executed by at least one processor, cause a computer system to:
- determine, for a plurality of users who received a marketing communication, an amount of time each user of the plurality of users takes to perform an action to interact with the marketing communication after receiving the marketing communication;
- store the amount of time each user of the plurality of users takes to perform the action to interact with the marketing communication after receiving the marketing communication as a dynamic data point for the user, wherein a plurality of past marketing campaigns corresponds to a plurality of dynamic data points for the plurality of users;
- generate a conversational index model based on plurality of dynamic data points associated with a plurality of past marketing campaigns;
- determine a plurality of interest scores for the plurality of users by determining areas underneath a distribution of the conversational index model;
- segment, based on the plurality of interest scores, the plurality of users into a plurality of segments;
- provide, to client devices of a first segment of users from the plurality of segments, a first additional marketing communication; and
- providing, to client devices of a second segment of users from the plurality of segments, a second additional marketing communication, wherein users in the second segment of users have lower interest scores than users in the first segment of interest scores.

18. The non-transitory computer readable storage medium as recited in claim 17, wherein the instructions that cause the computer system to determine the plurality of interest scores cause the computer system to:
- identify, for a particular marketing communication, an action performed by a user from the plurality of users within an observation period and an action not performed by the user within the observation period;
- determine a first probability for the action performed by the user within the observation period;
- determine a second probability for the action not performed by the user within the observation period; and
- determine an interest score for the user based on the first probability and the second probability.

19. The non-transitory computer readable storage medium as recited in claim 17, further comprising instructions that, when executed by the at least one processor, cause the computer system to:
- train the conversational index model using a training dataset based on dynamic data points associated with a first set of past marketing campaigns for the plurality of users; and
- determine the plurality of interest scores for the plurality of users associated with the training dataset using a second set of past marketing campaigns.

20. The non-transitory computer readable storage medium as recited in claim 17, wherein the instructions that cause the computer system to segment the plurality of users into a plurality of segments cause the computer system to segment the users into deciles or quintiles based on the plurality of determined interest scores.

* * * * *